(12) United States Patent
Carranza et al.

(10) Patent No.: US 9,940,122 B2
(45) Date of Patent: Apr. 10, 2018

(54) DYNAMIC DATA DIFFERENCE GENERATION AND DISTRIBUTION

(71) Applicant: Intel Corporation, Santa Clara, CA (US)

(72) Inventors: Marcos E. Carranza, Portland, OR (US); Krishna Surya, Beaverton, OR (US); Brian Cremeans, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 40 days.

(21) Appl. No.: 14/978,966

(22) Filed: Dec. 22, 2015

(65) Prior Publication Data
US 2017/0177325 A1    Jun. 22, 2017

(51) Int. Cl.
G06F 9/44       (2006.01)
G06F 9/445      (2018.01)
G06F 17/30      (2006.01)

(52) U.S. Cl.
CPC .......... G06F 8/65 (2013.01); G06F 17/30109 (2013.01); G06F 17/30575 (2013.01)

(58) Field of Classification Search
CPC ..... G06F 8/65; G06F 8/68; G06F 8/61; G06F 11/30109
USPC .................................. 717/168–171
See application file for complete search history.

(56) References Cited

U.S. PATENT DOCUMENTS

2008/0222193 A1*  9/2008  Reid ................. H03M 7/30
2011/0252414 A1   10/2011 Chiu et al.
2011/0307881 A1   12/2011 Konersmann
2013/0104118 A1    4/2013 Somani et al.
2013/0111458 A1    5/2013 Quin et al.
2015/0178063 A1    6/2015 Narkinsky et al.
2016/0117162 A1*   4/2016 Searle ................... H04L 41/082
                                                              717/173
2016/0198016 A1*   7/2016 Tiger .................... H04L 47/823
                                                              709/213

FOREIGN PATENT DOCUMENTS

JP    2009163602 A    7/2009
JP    2015153160 A    8/2015
(Continued)

OTHER PUBLICATIONS

"International Application Serial No. PCT/US2016/063562, International Search Report dated Mar. 10, 2017", 3 pgs.
(Continued)

*Primary Examiner* — Anna Deng
(74) *Attorney, Agent, or Firm* — Schwegman Lundberg & Woessner, P.A.

(57) ABSTRACT

A method of updating data may include receiving an update request from a computing device, the update request including a profile of a current set of data stored on the computing device; determining, based at least in part on the profile of the current set of data, an updated set of data is available; determining if a delta set of data has previously been generated to transform the current set of data to the updated set of data; and based on determining that the delta set of data has not been previously generated: generating the delta set of data; and transmitting an address, to the computing device, for obtaining the delta set of data by the computing device.

16 Claims, 5 Drawing Sheets

(56) References Cited

FOREIGN PATENT DOCUMENTS

| JP | 2015184871 A | 10/2015 |
|---|---|---|
| WO | WO-2008114491 A1 | 9/2008 |
| WO | WO-2009132261 A1 | 10/2009 |
| WO | WO-2017112289 A1 | 6/2017 |

OTHER PUBLICATIONS

"International Application Serial No. PCT/US2016/063562, Written Opinion dated Mar. 10, 2017", 8 pgs.
"Japanese Application Serial No. 2016-226019, Office Action dated Oct. 24, 2017", (English Translation), 6 pgs.

* cited by examiner

DYNAMIC DATA DIFFERENCE GENERATION AND DISTRIBUTION

TECHNICAL FIELD

Embodiments described herein generally relate to data file distribution and in particular, but without limitation, to dynamic data difference generation and distribution.

BACKGROUND

Electronic devices have many data files that provide functionality to the devices. From time-to-time these data files are updated. A device may transmit a request to a server to obtain an update to one or more of these data files.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Increasingly, users expect devices to and keep themselves continuously updated with the right software (e.g., firmware, applications, drivers, libraries, etc.). In many cases the onus has been put on the user to keep their devices updated, but with the sheer number devices owned by a user, it has become a difficult task.

Existing automatic updating techniques have numerous technical problems. For example, the size of the updates presents a particular challenge when a device has limited storage space and when bandwidth is at a premium. In areas with frequent or limited network access the size of an update may be the difference between a successful update and a failure. Thus, generating smaller and more intelligence updates may improve the odds of a successful update. Additionally, software cannot always be updated to the latest version for a variety of reasons leading to a manufacturer needed to maintain number different configurations of deployed devices. Consequently, device makers may have to keep multiple versions of software simultaneously deployed, with upgrade paths that are complex.

For program updating, static binary patching (also known as binary diff or bdiff) may help to reduce the payload size, but the generation of all possible patches may be impractical for large complex systems. For example, in a more traditional scenario, a manufacturer of a piece of software may maintain a limited set of update patch installers (e.g., version 1.1 to version 2.0, version 1.5 to 2.0, etc.). This task because much more difficult when there are numerous components and device configurations (e.g., in an Internet of Things (IoT) environment) as the number of patch installers would quickly increase. Furthermore, the manufacturer may not even know if a particular patch installer is needed—using unnecessary processing power and storage space.

In various examples described herein, an update management system is used to dynamically (e.g., on-demand) generate binary diffs—or other less than full size updates—in response to update requests. Such a system may lower overall computational, transmission, and storage costs in complex and large IoT eco-systems. Other benefits may also be realized as will be apparent to a person of ordinary skill in the art.

Figure 1:
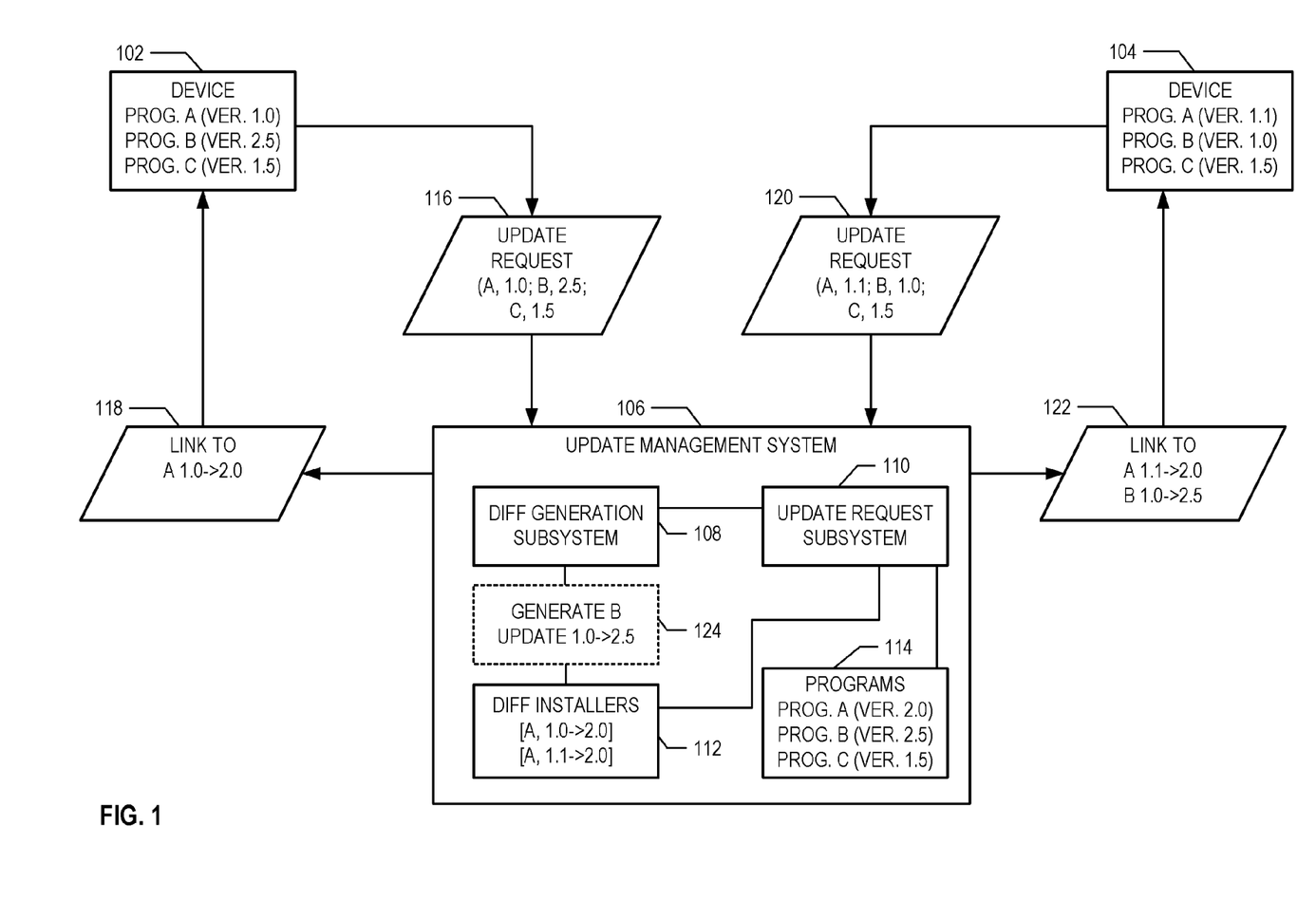
FIG. 1 is a schematic diagram of devices requesting program updates, according to various embodiments.

FIG. 1 is a schematic diagram of devices requesting program updates, according to various embodiments. The diagram includes device 102 and device 104 communicating with update management system 106 via a network (not shown). Update management system 106 includes diff generation subsystem 108, update request subsystem 110, diff installers 112, and program files 114. As will be discussed in further detail, device 102 is illustrated as transmitting update request 116 to update management system 106 and receiving installer response 118 in return. Similarly, device 104 transmit update request 120 and receives installer response 122. Update management system 106 also includes an example of a diff generation command 124.

The devices of in FIG. 1 may take on many forms. For example, a device may be a single-purpose device such as a motion sensor, drone, or thermostat. The device may also a more general purpose device such as a smart phone, tablet, or laptop computer. The devices may have various data files stored on non-transitory computer-readable media of the devices. The data files may be include, but are not limited to, application programs, network protocols, support files (e.g., dynamic linked libraries (DLL), shared object (so)), and resource files (e.g., maps, images, videos).

In various examples, the components illustrated in FIG. 1 may communicate via one or more networks. A network may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network may include a single local area network (LAN) or wide-area network (WAN), or combinations of LANs or WANs, such as the Internet.

Update management system 106 may be implemented as one or more subsystems executing on one or more computing devices. A subsystem may represent code stored on a storage medium executed on a processor of a computing device such as a software module. Operations of the subsystem may be distributed across many computing devices, which may be in more than one geographic location. In some instances, the same operation may be completed by more than one computing device.

Data that is described within update management system 106—such as diff installers 112 and program files 114—may be stored in a variety of manners. The data may be stored in one or more databases or as part of a file system. The specific storage layout and model used in a databases may take a number of forms indeed, each database may utilize multiple models. The databases may be, but are not limited to, a relational database (e.g., SQL), non-relational database (NoSQL) a flat file database, object model, document details model, or a file system hierarchy. The databases may store data on one or more storage devices (e.g., a hard disk, random access memory (RAM), etc.). The storage devices may be in standalone arrays, part of one or more servers, and may be located in one or more geographic areas. A database management system (DBMS) may be used to create, retrieve (e.g., from a query), update, and delete records from a database.

Figure 2:
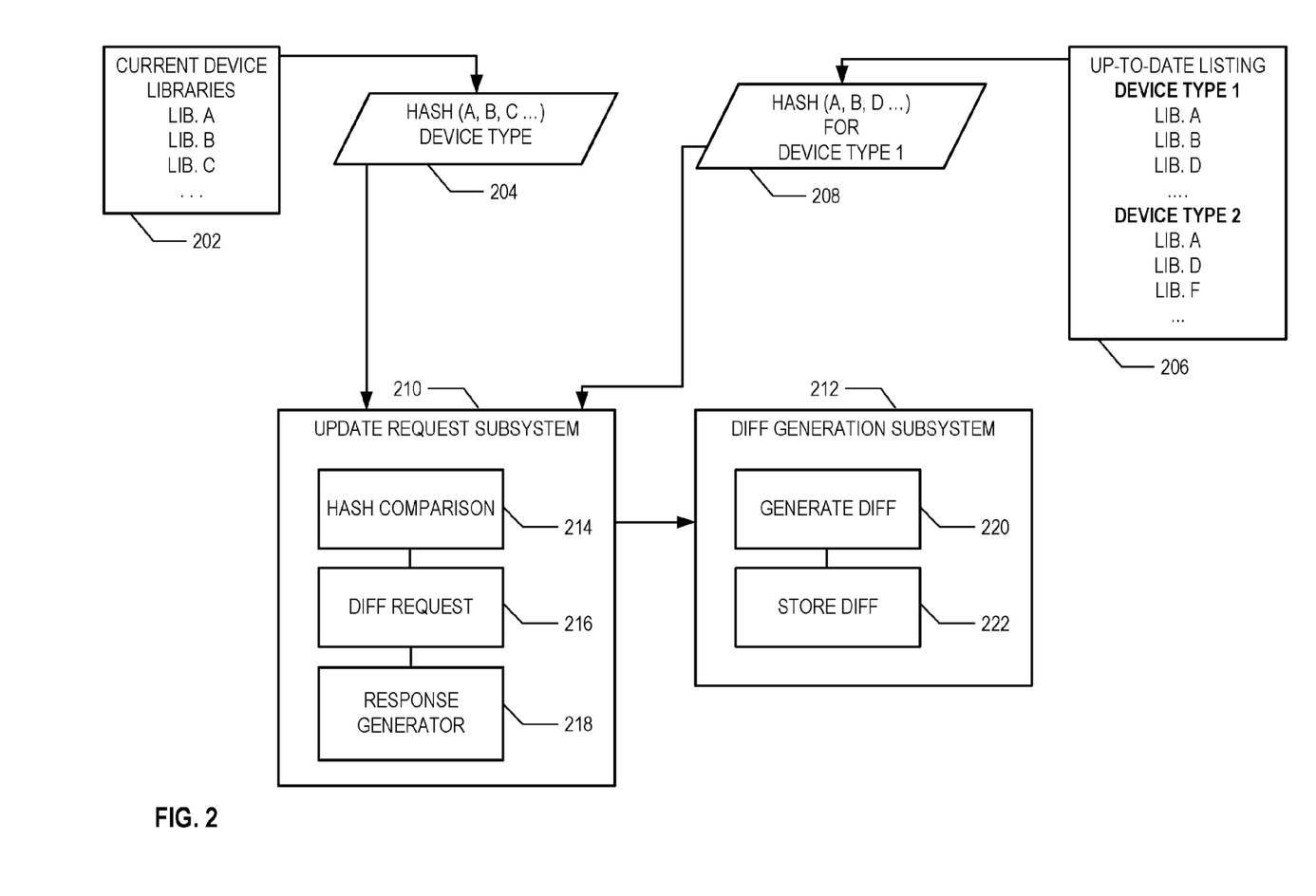
FIG. 2 is a schematic diagram of a device requesting library updates, according to various embodiments.

Update management system 106 may store information in program files 114 on the up-to-date versions of programs. For discussion purposes, FIG. 1 is described with respect to programs, but other types of data files may also be used. FIG. 2 describes another update process using libraries. Program files 114 may store the actual program files or a list of the up-to-date program files with their respective versions. As update management system 106 may be used by multiple program providers, program files 114 may also indicate the provider of the program. Program files 114 may also store outdated versions of programs or previously computed deltas between outdated versions for use in generating installers to the up-to-date versions of the programs.

The list in program files 114 may be represented in a number of ways and may include information beyond the version number. One way may be to include plain text entries of the name of the program and version. Another way may include a hash of the program file. The list may also include a digitally signed version of the hash or program.

Additionally, update management system 106 may provide an application programming interface (API) via a web server. The API may include commands for requesting updates from update management system 106 and providing installers in response to the requests. The API may also be used by application providers to indicate a new version of a program is available—updates to program files 114 may be made accordingly.

In FIG. 1, device 102 may generate a call to the API to issue update request 116. The API call may define a number of parameters that may be included in an update request. An update request may include at least one [program identification, version] pair. In the present example, update request 116 includes three such pairs; however, multiple update requests may be transmitting instead a single request.

The update request may be a hash based on current programs—such as discussed in more detail below with respect to FIG. 2—or as a series of hashes, one for each application. Another option may be to including one or more application signatures in the update request. Furthermore, the information in the update request may be encrypted, as well as digitally signed (e.g., by a key of the manufacturer of the device or publishers of the applications).

An update request may include additional information such as the type of the device. The type may indicate the device is a drone and the particular model number of the drone. Other types may include routers, sensors, laptops, mobile phones, etc., and their respective model numbers.

The update request subsystem 110 may receive the information included in the API call and process it to determine if updated versions of programs are available. The update request subsystem 110 may query a data store that includes an up-to-date listing of programs such as program files 114. The query may include the program identification from update request 116. The response to the query may include the up-to-date version number of the program identified in the query. Then, update request subsystem 110 may compare the current version of the program to the version included in update request 116 to determine if an updated version of the program is available for device 102.

As illustrated, device 102 already has the most up-to-date versions of programs B and C. In contrast, program A on device 102 is only version 1.0, but program files 114 indicates that 2.0 version is available. With respect to device 104, both programs A and B are out-of-date, but C does not require an update.

A subsequent query may be made to diff installers 112 based on update request subsystem 110 determining that an updated version of one or programs is available. This query may include the current version of programs on device 102, or device 104, that are deemed to be outdated. The data included in response to this subsequent query may indicate if an installer is available to update the current version of a program to an updated version of the program.

With respect to device 102, diff installers 112 includes an installer for program A from version 1.0 to 2.0. It similarly includes an update from version 1.1 to 2.0 for device 104. However, diff installers 112 does not include an installer from 1.0 to 2.5 for program B for device 102. When update request subsystem 110 determines that an installer is not available, an automatic request may be made to diff generation subsystem 108. The request to diff generation subsystem 108 may include the current version of the program (as stored on a device 104) and a program identification.

The diff generation subsystem 108 may perform diff generation command 124 to generate an installer to update version 1.0 of program B to version 2.5 for device 104, for example. The resulting installer may be stored in diff installers 112. Consequently, the next time a device needs to update from version 1.0 to 2.5 for program B, the installer will already be available and not need to be generated again.

In various examples, an installer may be generated based on the differences between versions of a program. The installer may include exclude data that is similar between the two versions thereby reducing the overall size of the installer. The generation of the installer may include identifying where changes exist between the two versions and creating a patch file to update these areas to the current version (e.g., using bdiff and bpatch command line tools or similar programs).

After creation of the installers, installer response 118 and installer response 122 may be transmitted to device 102 and device 104, respectively. The installer responses may include a link of where to obtain the installers in diff installers 112. The link may be a direct link or include information to use in a subsequent API call to update management system 106. The information may include path information (e.g., "/progA/v1-to-v2") that may be used by update management system 106 to retrieve the correct installer from diff installers 112 and pass it back to the requesting device. The information in installer response 118 and installer response 122 may be encrypted.

FIG. 2 is a schematic diagram of a device requesting library updates, according to various embodiments. FIG. 2 includes device library listing 202, update request 204, up-to-date listing 206, up-to-date hash 208, update request subsystem 210, and diff generation subsystem 212. Update request subsystem 210 includes hash comparison operation 214, diff request operation 216, and response generator 218. Diff generation subsystem 212 includes generate diff operation 220 and store diff operation 222. While illustrated as separate components, update request subsystem 210, diff generation subsystem 212, and up-to-date listing 206 may exist with a single computing device.

FIG. 2 illustrates an example of updating libraries on a device. Instead of transmitting (program identification, version) pairs, FIG. 2 illustrates the use of a single hash to identify device library listing 202. This may be useful in situations where hundreds of libraries are stored on a device and the device is at a location where bandwidth is at a premium. In such situations it may be impractical to send hundreds of individual requests.

To alleviate the technical challenges in such a situation, a hash may be created based on a listing of the libraries stored on a device. The listing may be [Library A version 1.0, Library B version 2.2, . . . ]. In another example, the hash may be the result of using the first few bytes of each library. The device may generate the hash and transmit it in update request 204—optionally including the type of the device—to update request subsystem 210. The update request subsystem 210 may be part of an update management system.

Update request subsystem 210 may also receive up-to-date hash 208 for the device type included in update request 204. Update request subsystem 210 may receive the hash in response to a request from update request subsystem 210 to a hash generation subsystem (not shown). The hash generation subsystem may calculate the hash using the up-to-date listing 206 in a similar manner as the device that stores device library listing 202.

Update request subsystem 210 may perform hash comparison operation 214 to determine update request 204 and up-to-date hash 208 include the same hash. If the hashes are the same, a response may be transmitted back the device indicating no updates are available. If the hashes are different—implying there are newer versions available—update request subsystem 210 may query a listing of installers to see if an installer is available from the hash device program listing 202 to up-to-date listing 206.

Figure 3:
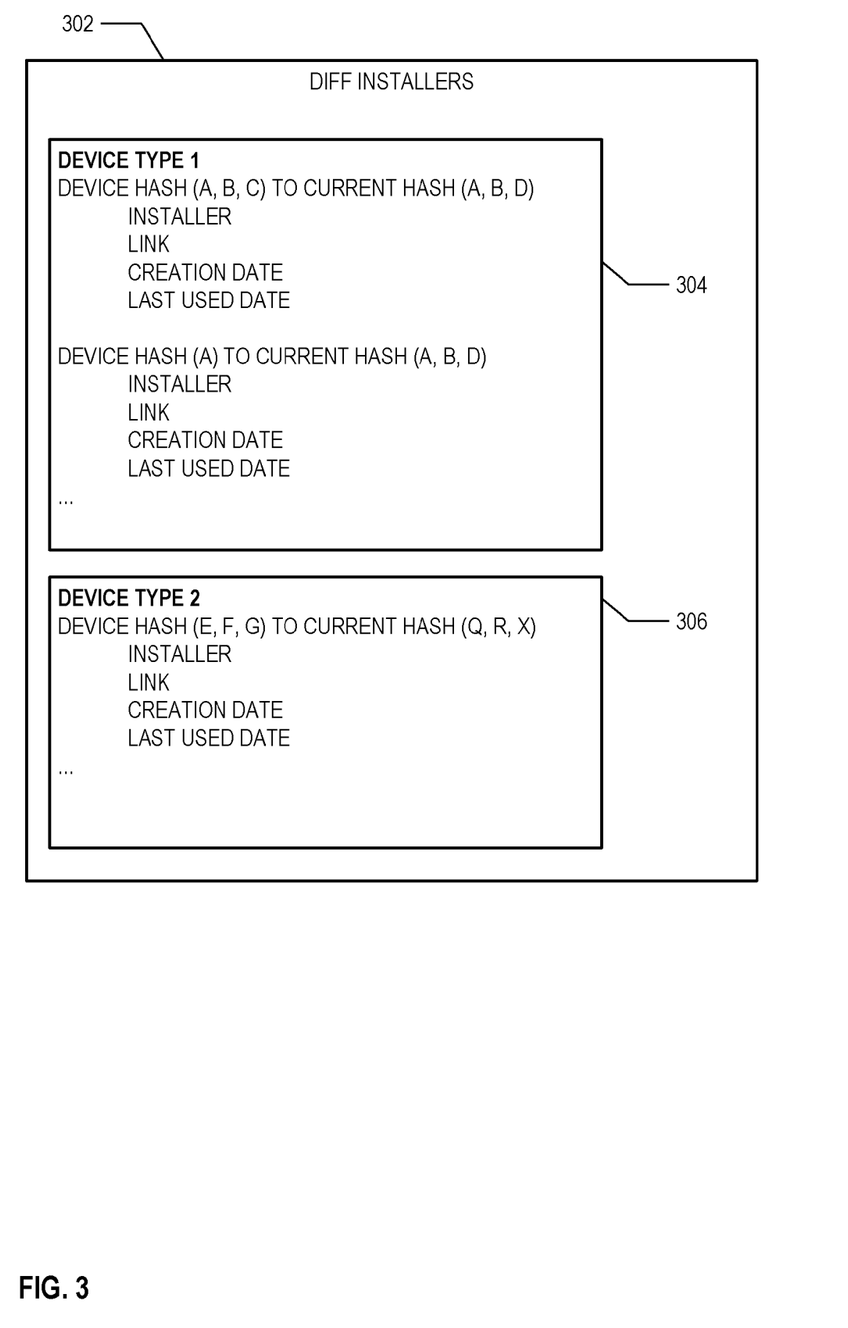
FIG. 3 illustrates a listing of installers by device type, according to various examples.

FIG. 3 illustrates a listing of installers by device type, according to various examples. Although FIG. 3 illustrates device type one installers 304 and device type two installers 306, more device types may be added without departing from the scope of this disclosure. As seen, device type one installers 304 includes an entry to update a device with Hash(A, B, C) to Hash(A, B, D) as well as an entry to update from libraries (E, F, G) to (Q, R, X). For simplicity the hashes are represented by the libraries they are based on and not the output of the hash, which would obfuscate this information.

An entry may include an installer (e.g., a patch file), a link to the installer, a creation date, and a last used date. An entry does not require all of this information. Over time, installers may be less and less used. Accordingly, a system (e.g., update management system 106) may delete old installers. The deletion may be based on one or more or the creation date and the last used date. In the case where a larger amount of updates are required, a fast presence detection algorithm (such as bloom filter) may be used to detect the need to generate a new delta. For example, an installer may be deleted after one year or if it has not been used within the past 60 days.

The criteria for deletion may be stored within the update management system 106. Periodically (e.g., every day or week), update management system 106 may examine diff installers 302 and check the creation date and last used date. If the criteria are met, the installer may be deleted. In another example, the installer may be moved to a tertiary storage device instead of being deleted.

With reference back to FIG. 2, when an installer is not available in diff installers 302, diff request operation 216 may be invoked. The diff request operation 216 may be forwarded to diff generation subsystem 212 to generate an installer from device library listing 202 to the up-to-date listing 206.

Diff generation subsystem 212 includes generate diff operation 220 and store diff operation 222. Because hashes are being used, diff generation subsystem 212 may not readily have available the files to perform a binary diff. Additionally, it is computationally hard to retrieve the actual library listing from the hash. Accordingly, in some examples, a mapping of hashes to library listings is stored (this information may be received from a manufacturer of a device). In another example, after determining an installer is not available, a request may be transmitted to the device that transmitted update request 204 for the identification, and optionally versions, of libraries. In this manner, relatively high bandwidth usage may be limited to when update request subsystem 210 determines an update is required and not readily available.

After retrieving the actual library listing from the map or device, the generate diff operation 220 may be performed in a similar manner as discussed in FIG. 1. Then, store diff operation 222 may be performed to store the installer (e.g., in diff installers 302). After storage, a link may be generated to the installer. The link may be transmitted back to the device at response generator 218.

Although the examples discussed above have generally focused on updates to libraries or programs, other use cases are also possible. For example, consider a device with a set of libraries [A, B, C] that are on a drone. Each library may be independent of the others. For example, library A may be used for object detection, B for location, and C for movement. A drone manufacturer may determine that another provider of object detection software is now available and library D should be used instead of library A. In such an instance, version numbers are potentially irrelevant. Thus, update management system 106 may check a listing of libraries in addition to (or in place of) versions to determine if libraries should be swapped out.

Further granularity may also be used within a library or program itself. For example, execution code may not change for a program, but resources (e.g., music files, image files etc.) may be updated. The update management system 106 may handle such updates using a hash of the resource. If the hash does not match, a link to the new resource may be provided.

Figure 4:
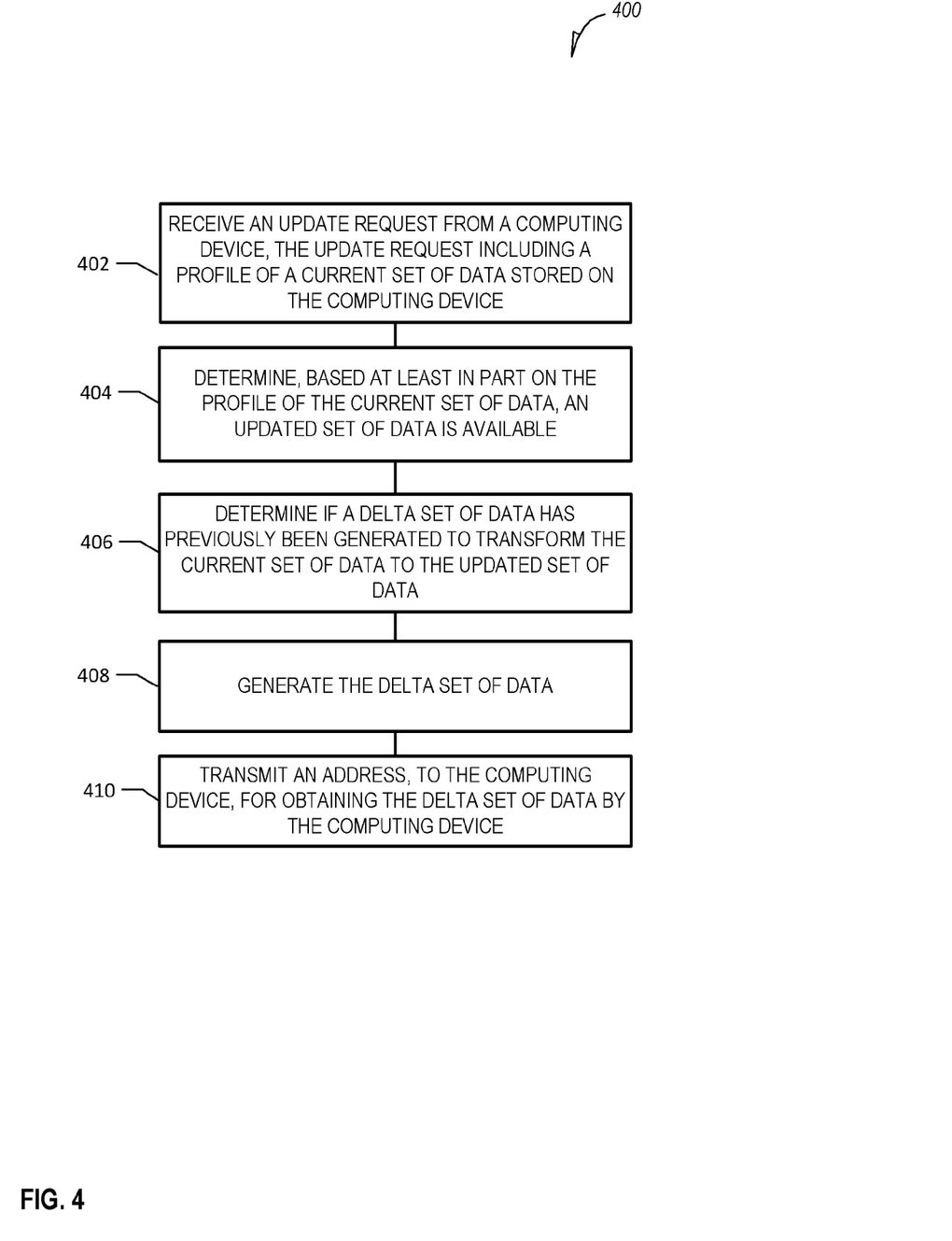
FIG. 4 is a flowchart of a method of update a set of data, according to various examples.

FIG. 4 is a flowchart of a method of update a set of data, according to various examples. The method may be performed using one or more of the subsystems described herein. At operation 402, an update request from a computing device may be received. The update request may be received at an update management system. The update request may include a profile of a current set of data stored on the computing device. The set of data may include applications, libraries, or resources on the device. The profile of the current set of data may identify a version of software installed on the computing device.

In some examples, the update request is received in response to the update management system (or other system) transmitting a message to the computing device to check with the update management system for available updates. In other examples, the update request may be initiated from the computing device. The update request may be transmitted periodically from the computing device.

In an example, at operation 404, it is determined, based at least in part on the profile of the current set of data, that an updated set of data is available. The determining may include determining a newer version of the software is available. In an example, the profile of the current set of data includes a list of libraries stored on the computing device and determining an update set of data is available may include determining at least of the libraries has been replaced.

At operation 406, in an example, it is determined if a delta set of data has previously been generated to transform the current set of data to the updated set of data. The delta set of data may include an installer to update the software installed on the computing device to the newer version of the software. The delta set of data may be based on a difference in binaries of the current set of data and the updated set of data.

If it is determined a delta set of data had not previously been generated, the delta set of data may be generated (operation 408). At operation 410, an address for obtaining the delta set of data may be transmitted to the computing device.

The method illustrated in FIG. 4 may further include receiving a second update request from a second computing device, the update request including a second profile of a current set of data stored on the second computing device. Based on determining that the second profile of the current set of data stored on the second computing device matches the profile of the current set of data stored on the computing device an address to delta set of data may be transmitted to the second computing device for retrieval by the second computing device.

In an example, the profile of the current set of data stored on the computing device and the second profile of the current set of data stored on the second computing device include respective hashes of the respective currents sets of data. Additionally, determining that the second profile of the current set of data stored on the second computing device matches the profile of the current set of data stored on the computing device may include comparing the respective hashes of the respective currents sets of data.

The method illustrated in FIG. 4 may further include receiving a second update request from a second computing device, the update request including a second profile of a current set of data stored on the second computing device. Based on determining that the second profile of the current set of data stored on the second computing device does not match the profile of the current set of data stored on the computing device a second delta set of data may be generated. An address may be transmitted to the second computing device to the second delta set of data for retrieval by the second computing device Example Computer System Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
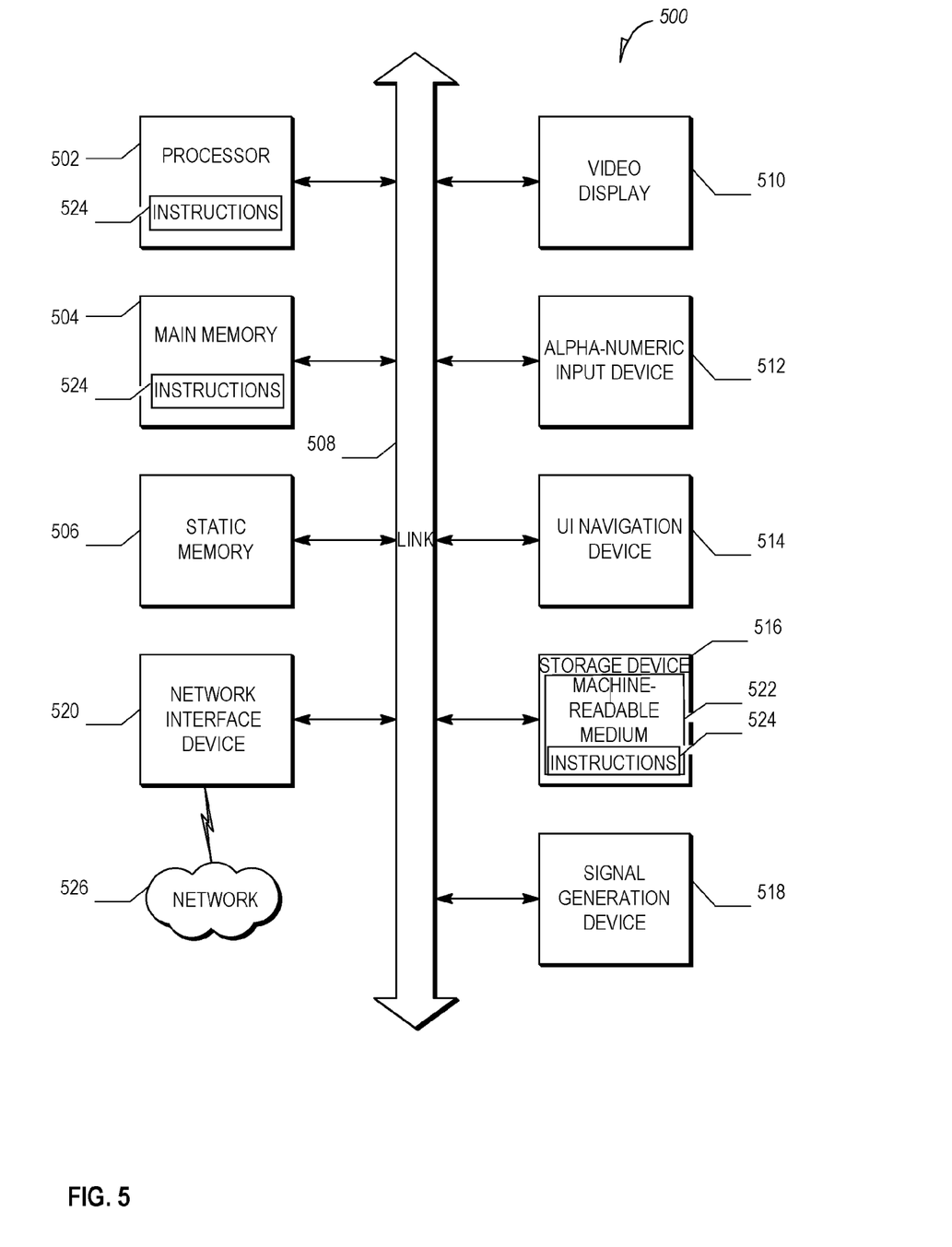
FIG. 5 is a block diagram illustrating an example machine upon which any one or more of the techniques (e.g., methodologies) discussed herein may be performed, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 5G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Example 1 is a system for updating data, the system comprising: at least one processor; a storage-readable medium comprising instructions stored thereon, which when executed by the at least one processor, configure the processor to: receive an update request from a computing device, the update request including a profile of a current set of data stored on the computing device; determine if a delta set of data has previously been generated to transform the current set of data to an updated set of data; and based on a determination that the delta set of data has not been previously generated: generate the delta set of data; and transmit an address, to the computing device, for obtaining the delta set of data by the computing device.

In Example 2, the subject matter of Example 1 optionally includes, wherein the instructions, when executed by the at least one processor, configure the at least one processor to: determine, based at least in part on the profile of the current set of data, that the updated set of data is available.

In Example 3, the subject matter of Example 2 optionally includes, wherein the profile of the current set of data identifies a version of software installed on the computing device and wherein to determine the updated set of data is available, the at least one processor is configured to determine a newer version of the software is available.

In Example 4, the subject matter of Example 3 optionally includes, wherein the delta set of data includes an installer to update the software installed on the computing device to the newer version of the software.

In Example 5, the subject matter of any one or more of Examples 2-4 optionally include, wherein the profile of the current set of data includes a list of libraries stored on the computing device and wherein to determine the updated set of data is available, the at least one processor is configured to determine at least one of the libraries has been replaced.

In Example 6, the subject matter of any one or more of Examples 1-5 optionally include, wherein the delta set of data is based on a difference in binaries of the current set of data and the updated set of data.

In Example 7, the subject matter of any one or more of Examples 1-6 optionally include, wherein the instructions, when executed by the at least one processor, configure the at least one processor to: receive a second update request from a second computing device, the second update request including a profile of a current set of data stored on the second computing device; and based on determining that the profile of the current set of data stored on the second computing device matches the previously received profile of the current set of data stored on the computing device: transmit an address, to the second computing device, to the delta set of data for retrieval by the second computing device.

In Example 8, the subject matter of Example 7 optionally includes, wherein the profile of the current set of data stored on the computing device and the profile of the current set of data stored on the second computing device include respective hashes of the respective current sets of data.

In Example 9, the subject matter of any one or more of Examples 7-8 optionally include, wherein to determine that the profile of the current set of data stored on the second computing device matches the previously received profile of the current set of data stored on the computing device, the at least one processor is configured to compare the respective hashes of the respective currents sets of data.

In Example 10, the subject matter of any one or more of Examples 1-9 optionally include, wherein the instructions, when executed by the at least one processor, configure the at least one processor to: receive a second update request from a second computing device, the update request including a profile of a current set of data stored on the second computing device; and based on a determination that the profile of the current set of data stored on the second computing device does not match the profile of the current set of data stored on the computing device: generate a second delta set of data; and transmit an address, to the second computing device, to the second delta set of data for retrieval by the second computing device.

Example 11 is a method of updating data, the method comprising: receiving an update request from a computing device, the update request including a profile of a current set of data stored on the computing device; determining if a delta set of data has previously been generated to transform the current set of data to an updated set of data; and based on determining that the delta set of data has not been previously generated: generating the delta set of data; and transmitting an address, to the computing device, for obtaining the delta set of data by the computing device.

In Example 12, the subject matter of Example 11 optionally includes, further comprising: determining, based at least in part on the profile of the current set of data, that the updated set of data is available.

In Example 13, the subject matter of Example 12 optionally includes, wherein the profile of the current set of data identifies a version of software installed on the computing device and wherein determining that the updated set of data is available includes determining that a newer version of the software is available.

In Example 14, the subject matter of Example 13 optionally includes, wherein the delta set of data includes an installer to update the software installed on the computing device to the newer version of the software.

In Example 15, the subject matter of any one or more of Examples 12-14 optionally include, wherein the profile of the current set of data includes a list of libraries stored on the computing device and wherein determining that the updated set of data is available includes determining that at least one of the libraries has been replaced.

In Example 16, the subject matter of any one or more of Examples 11-15 optionally include, wherein the delta set of data is based on a difference in binaries of the current set of data and the updated set of data.

In Example 17, the subject matter of any one or more of Examples 11-16 optionally include, further comprising: receiving a second update request from a second computing device, the second update request including a profile of a current set of data stored on the second computing device; and based on determining that the profile of the current set of data stored on the second computing device matches the previously received profile of the current set of data stored on the computing device: transmitting an address, to the second computing device, to the delta set of data for retrieval by the second computing device.

In Example 18, the subject matter of Example 17 optionally includes, wherein the profile of the current set of data stored on the computing device and the second profile of the current set of data stored on the second computing device include respective hashes of the respective currents sets of data.

In Example 19, the subject matter of any one or more of Examples 17-18 optionally include, wherein determining that the second profile of the current set of data stored on the second computing device matches the previously received profile of the current set of data stored on the computing device includes comparing the respective hashes of the respective current sets of data.

In Example 20, the subject matter of any one or more of Examples 11-19 optionally include, further comprising: receiving a second update request from a second computing device, the second update request including a profile of a current set of data stored on the second computing device; and based on determining that the profile of the current set of data stored on the second computing device does not match the previously profile of the current set of data stored on the computing device: generating a second delta set of data; and transmitting an address, to the second computing device, to the second delta set of data for retrieval by the second computing device.

Example 21 is at least one machine-readable medium including instructions, which when executed by a machine, cause the machine to perform operations of any of the methods of Examples 11-20.

Example 22 is an apparatus comprising means for performing any of the methods of Examples 11-20.

Example 23 is an apparatus of updating data, the apparatus comprising: means for receiving an update request from a computing device, the update request including a profile of a current set of data stored on the computing device; means for determining if a delta set of data has previously been generated to transform the current set of data to an updated set of data; and means for based on determining that the delta set of data has not been previously generated: means for generating the delta set of data; and means for transmitting an address, to the computing device, for obtaining the delta set of data by the computing device.

In Example 24, the subject matter of Example 23 optionally includes, further comprising: means for determining, based at least in part on the profile of the current set of data, that the updated set of data is available.

In Example 25, the subject matter of Example 24 optionally includes, wherein the profile of the current set of data identifies a version of software installed on the computing device and wherein means for determining that the updated set of data is available includes means for determining that a newer version of the software is available.

In Example 26, the subject matter of Example 25 optionally includes, wherein the delta set of data includes an installer to update the software installed on the computing device to the newer version of the software.

In Example 27, the subject matter of any one or more of Examples 24-26 optionally include, wherein the profile of the current set of data includes a list of libraries stored on the computing device and wherein means for determining that the updated set of data is available includes means for determining that at least one of the libraries has been replaced.

In Example 28, the subject matter of any one or more of Examples 23-27 optionally include, wherein the delta set of data is based on a difference in binaries of the current set of data and the updated set of data.

In Example 29, the subject matter of any one or more of Examples 23-28 optionally include, further comprising: means for receiving a second update request from a second computing device, the second update request including a profile of a current set of data stored on the second computing device; and means for based on determining that the profile of the current set of data stored on the second computing device matches the previously received profile of the current set of data stored on the computing device: means for transmitting an address, to the second computing device, to the delta set of data for retrieval by the second computing device.

In Example 30, the subject matter of Example 29 optionally includes, wherein the profile of the current set of data stored on the computing device and the second profile of the current set of data stored on the second computing device include respective hashes of the respective currents sets of data.

In Example 31, the subject matter of any one or more of Examples 29-30 optionally include, wherein means for determining that the second profile of the current set of data stored on the second computing device matches the previously received profile of the current set of data stored on the computing device includes means for comparing the respective hashes of the respective current sets of data.

In Example 32, the subject matter of any one or more of Examples 23-31 optionally include, further comprising: means for receiving a second update request from a second computing device, the second update request including a profile of a current set of data stored on the second computing device; and means for based on determining that the profile of the current set of data stored on the second computing device does not match the previously profile of the current set of data stored on the computing device: means for generating a second delta set of data; and means for transmitting an address, to the second computing device, to the second delta set of data for retrieval by the second computing device.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A system for updating data, the system comprising:
   at least one processor;
   a storage-readable medium comprising instructions stored thereon, which when executed by the at least one processor, configure the processor to:
   receive an update request via an application program interface (API) from a computing device, the update request including a profile of a current set of data stored on the computing device and a device type identifying a type corresponding to the computing device on which the current set of data is to be updated, wherein the profile of a current set of data:
   identifies a current version of executable software installed on the computing device to determine if an updated set of data is available, and determine if a newer version of the executable software is available for the device type, wherein the updated set of data includes the newer version of the executable software, and
   includes a hash code to identify a plurality of device libraries having executable data stored on the computing device, and the at least one processor is configured to decode the hash code and to determine at least one of the libraries of the plurality of libraries has been replaced;
   determine if a delta set of data has previously been generated to transform the current set of data to the updated set of data for the device type; and
   based on a determination that the delta set of data has not been previously generated for the current version of executable software and the device type:
   generate the delta set of data, wherein the delta set of data includes differences between the current version of executable software and newer version of executable software; and
   transmit an address, to the computing device, for obtaining the delta set of data by the computing device.

2. The system of claim 1, wherein the instructions, when executed by the at least one processor, configure the at least one processor to:
   determine, based at least in part on the profile of the current set of data, that, the updated set of data is available.

3. The system of claim 1, wherein the delta set of data includes an installer associated with the device type to update the executable software installed on the computing device to the newer version of the executable software.

4. The system of claim 1, wherein the delta set of data is based on a difference in binaries of the current set of data and the updated set of data.

5. The system of claim 1, wherein the instructions, when executed by the at least one processor, configure the at least one processor to:
   receive a second update request from a second computing device, the second update request-including a profile of a current set of data stored on the second computing device including a device type identifying a type corresponding to the second computing device on which the current set of data stored on the second computing device is to be updated; and
   based on determining that the profile of the current set of data stored on the second computing device matches the previously received profile of the current set of data stored on the computing device,
   transmit an address, to the second computing device, to the delta set of data for retrieval by the second computing device.

6. The system of claim 5, wherein the profile of the current set of data stored on the computing device and the profile of the current set of data stored on the second computing device include respective hashes of the respective current sets of data.

7. The system of claim 6, wherein to determine that the profile of the current set of data stored on the second computing device matches the previously received profile of the current set of data stored on the computing device, the at least one processor is configured to compare the respective hashes of the respective currents sets of data.

8. The system of claim 1, wherein the instructions, when executed by the at least one processor, configure the at least one processor to:
   receive a second update request from a second computing device, the second update request including a profile of a current set of data stored on the second computing device including a device type identifying a type corresponding to the second computing device on which the current set of data is to be updated, wherein the profile of the current set of data stored on the second computing device identifies a current version of executable software installed on the second computing device; and
   based on a determination that the profile of the current set of data stored on the second computing device does not match the profile of the current set of data stored on the computing device for the current version of executable software installed on the second computing device and the device type identifying a type corresponding to the computing device, generate a second delta set of data; and transmit an address, to the second computing device, to the second delta set of data for retrieval by the second computing device.

9. The system of claim 1, wherein the hash is generated based on a listing of the plurality of device libraries.

10. The system of claim 1, wherein the hash is generated using a first few bytes of each of the plurality of device libraries.

11. A method of updating data, the method comprising:

receiving an update request from a computing device, the update request including a profile of a current set of data stored on the computing device and a device type identifying a type corresponding to the computing device on which the current set of data is to be updated, wherein the profile of the current set of data:

identifies a current version of executable software installed on the computing device to determine an updated set of data is available includes determining a newer version of the executable software is available for the device type, wherein the updated set of data includes the newer version of the executable software, and     includes a hash code to identify a plurality of device libraries having executable data stored on the computing device, and decodes the hash code to determine at least one of the libraries of the plurality of libraries has been replaced;

determining if a delta set of data has previously been generated to transform the current set of data to the updated set of data for the device type; and based on determining that the delta set of data has not been previously generated for the current version of executable software and the device, generating the delta set of data, wherein the delta set of data includes differences between the current version of executable software and newer version of executable software; and transmitting an address, to the computing device, for obtaining the delta set of data by the computing device.

12. The method of claim 11, further comprising:

determining, based at least in part on the profile of the current set of data, that the updated set of data is available.

13. The method of claim 11, wherein the delta set of data includes an installer associated with the device type to update the current version of executable software installed on the computing device to the newer version of the executable software.

14. At least one non-transitory machine-readable medium including instructions for updating data, which when executed by a machine, cause the machine to perform operations comprising:

receiving an update request from a computing device, the update request including a profile of a current set of data stored on the computing device and a device type identifying a type corresponding to the computing device on which the current set of data is to be updated, wherein the profile of the current set of data identifies a current version of executable software installed on the computing device and the device type and wherein to determine an updated set of data is available includes determining a newer version of the executable software is available for the device type, wherein the updated set of data includes the newer version of the executable software;

determining if a delta set of data has previously been generated to transform the current set of data to the updated set of data for the device type; and based on determining that the delta set of data has not been previously generated,     generating the delta set of data, wherein the delta set of data includes differences between the current version of executable software and newer version of executable software, and     an installer associated with the device type to update the current version of executable software installed on the computing device to the newer version of the executable software; and transmitting an address, to the computing device, for obtaining the delta set of data by the computing device.

15. The at least one machine-readable medium of claim 14, the operations further comprising:

determining, based at least in part on the profile of the current set of data, that the updated set of data is available.

16. The at least one machine-readable medium of claim 15, wherein the profile of the current set of data includes a hash code to Identify a device library listing associated with a plurality of libraries stored on the computing device and wherein the operation of determining that the updated set of data is available includes determining that at least one of the libraries has been replaced.

\* \* \* \* \*